United States Patent
Pan et al.

(10) Patent No.: US 11,343,815 B2
(45) Date of Patent: May 24, 2022

(54) METHOD AND DEVICE FOR DETECTING SLOT FORMAT INDICATION, AND METHOD AND DEVICE FOR CONFIGURING SLOT FORMAT INDICATION

(71) Applicant: VIVO MOBILE COMMUNICATION CO., LTD., Guangdong (CN)

(72) Inventors: Xueming Pan, Guangdong (CN); Xiaodong Shen, Guangdong (CN); Lei Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 145 days.

(21) Appl. No.: 16/764,540

(22) PCT Filed: Oct. 17, 2018

(86) PCT No.: PCT/CN2018/110607
§ 371 (c)(1),
(2) Date: May 15, 2020

(87) PCT Pub. No.: WO2019/095917
PCT Pub. Date: May 23, 2019

(65) Prior Publication Data
US 2020/0389894 A1 Dec. 10, 2020

(30) Foreign Application Priority Data
Nov. 17, 2017 (CN) .......................... 201711148153.0

(51) Int. Cl.
*H04W 72/04* (2009.01)
*H04L 5/00* (2006.01)
*H04L 5/14* (2006.01)

(52) U.S. Cl.
CPC .......... *H04W 72/0446* (2013.01); *H04L 5/001* (2013.01); *H04L 5/1469* (2013.01); *H04W 72/042* (2013.01)

(58) Field of Classification Search
CPC ...................... H04W 72/0446; H04W 72/042; H04L 5/001; H04L 5/1469
USPC ....................................................... 370/280
See application file for complete search history.

(56) References Cited

PUBLICATIONS

Extended European Search Report dated Nov. 6, 2020 issued in PCT/CN2018/110607.
(Continued)

*Primary Examiner* — Peter G Solinsky
(74) *Attorney, Agent, or Firm* — Brooks Kushman P.C.

(57) ABSTRACT

A method and a device for detecting slot format indication, and a method and a device for configuring slot format indication are provided. The method for detecting slot format indication is applied to a terminal and includes: obtaining a bit length of SFI index information of a target cell or a target carrier and a slot format configuration set corresponding to the bit length; detecting the SFI index information of the target cell or the target carrier; and determining a slot format configuration corresponding to the detected SFI index information based on the detected SFI index information and the slot format configuration set corresponding to the bit length of the detected SFI index information.

19 Claims, 5 Drawing Sheets

(56) References Cited

PUBLICATIONS

3GPP TSG RAN WG1 NR Meeting 90bis, R1-1717485, "Design of Group-Common PDCCH", Prague, CZ, Oct. 9-13, 2017, 10 pages.
3GPP TSG RAN WG1 Meeting 90bis, R1-1717512, "Remaining Details on Group-Common PDCCH", Prague, CZ, Oct. 9-13, 2017, 6 pages.
3GPP TSG RAN WG1 Meeting 90bis, R1-1718276, "Remaining Issues on Group-Common PDCCH for NR", Prague, CZ, Oct. 9-13, 2017, 7 pages.

METHOD AND DEVICE FOR DETECTING SLOT FORMAT INDICATION, AND METHOD AND DEVICE FOR CONFIGURING SLOT FORMAT INDICATION

CROSS-REFERENCE TO RELATED APPLICATIONS

This application is the U.S. national phase of PCT Application No. PCT/CN2018/110607 filed on Oct. 17, 2018, which claims a priority to Chinese Patent Application No. 201711148153.0 filed on Nov. 17, 2017, both disclosures of which are incorporated in their entireties by reference herein.

TECHNICAL FIELD

The present disclosure relates to the field of wireless communication technologies, in particular to a method and a device for detecting slot format indication, and a method and a device for configuring slot format indication.

BACKGROUND

In a new radio (NR) time division duplex (TDD) system, a base station can perform semi-static downlink/uplink (DL/UL) configuration for a user equipment (UE) via a cell-specific higher layer signaling. The base station may also perform semi-static DL/UL configuration for the UE via a UE-specific higher layer signaling. In addition, the base station may also perform dynamic DL/UL configuration for the UE based on a dynamic slot format indication (SFI) transmitted by a group common physical downlink control channel (group-common PDCCH). Each DL/UL configuration includes several DL slots and/or symbols (slots/symbols), unknown slots/symbols, and UL slots/symbols.

For the above three different DL/UL configuration methods, the DL/UL slots/symbols in the semi-static configuration cannot be overridden by information carried by the dynamic SFI, that is, the semi-static DL/UL transmission direction cannot be changed. Semi-static unknown slots/symbols can be changed by the information carried by the dynamic SFI. That is, when the dynamic SFI indicates DL or UL, semi-static unknown slots/symbols may change to DL slots/symbols or UL slots/symbols. The slots/symbols, which are indicated as unknown by the dynamic SFI, are still unknown. If an unknown resource is not overridden, the UE does not transmit or receive information on the unknown resource, which is similar to a reserved resource. The UE decides whether to receive data by monitoring a channel according to these overriding rules or priority rules or to transmit data based on the scheduling.

With regard to the dynamic SFI, the 3GPP in related technologies has concluded as following. The SFI information specifically indicates a structure of a slot, including lengths of the DL part, the UL part, and the unknown part in the slot. The possible configurations are listed in a form of table, and SFI indicates an item in the table. It is agreed in related technologies that up to 256 configuration possibilities are allowed in one slot, that is to say, up to 8 bits is required by SFI to indicate information of one SFI index. Table 1 shows a slot format indication table with 256 types of configurations (entries), where DL represents downlink symbol(s), UL represents uplink symbol(s), and U represents unknown symbol(s).

TABLE 1

Example of single slot format indication table

| Index\Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | DL | DL | DL | U | U | U | U | U | U | U | U | U | U | UL |
| 1 | DL | DL | U | U | U | U | U | U | U | U | U | U | UL | UL |
| 2 | DL | U | U | U | U | U | U | U | U | U | U | UL | UL | UL |
| 3 | U | U | U | U | U | U | U | U | U | U | U | U | U | U |
| ... | | | | | | | | | | | | | | |
| 255 | DL | DL | DL | U | UL | UL | UL | DL | DL | DL | U | UL | UL | UL |

In view of the above, 8 bits are used to indicate information of one SFI index in related technologies, which results in a large resource overhead of SFI index information and the poor flexibility in configuring the SFI index information.

SUMMARY

In a first aspect, embodiments of the present disclosure provide a method for detecting slot format indication, which is applied to a terminal and includes:

obtaining a bit length of slot format indication (SFI) index information of a target cell or a target carrier and a slot format configuration set corresponding to the bit length;

detecting the SFI index information of the target cell or the target carrier; and determining a slot format configuration corresponding to the detected SFI index information based on the detected SFI index information and the slot format configuration set corresponding to the bit length of the detected SFI index information.

In a second aspect, embodiments of the present disclosure provide a method for configuring slot format indication, which is applied to a network-side device and includes:

configuring, for a terminal, related information used to obtain a bit length of SFI index information of a target cell or a target carrier; and transmitting the SFI index information to the terminal.

In a third aspect, embodiments of the present disclosure provide a terminal, including:

an obtaining module, configured to obtain a bit length of slot format indication (SFI) index information of a target cell or a target carrier and a slot format configuration set corresponding to the bit length;

a detection module, configured to detect the SFI index information of the target cell or the target carrier; and a first determination module, configured to determine a slot format configuration corresponding to the detected SFI index information based on the detected SFI index information and the slot format configuration set corresponding to the bit length of the detected SFI index information.

In a fourth aspect, embodiments of the present disclosure provide a network-side device, including:

a first configuration module, configured to configure, for a terminal, related information used to obtain a bit length of SFI index information of a target cell or a target carrier; and a transmission module, configured to transmit the SFI index information to the terminal.

In a fifth aspect, embodiments of the present disclosure provide a terminal, which includes a processor, a memory, and a program that is stored on the memory and executable on the processor. When executing the program, the processor is configured to implement steps of the above method for detecting slot format indication.

In a sixth aspect, embodiments of the present disclosure provide a network-side device, which includes a processor, a memory, and a program that is stored on the memory and executable on the processor. When executing the program, the processor is configured to implement steps of the above method for configuring slot format indication.

In a seventh aspect, embodiments of the present disclosure provide a computer-readable storage medium, which stores a program. The program is executed by a processor to implement steps of the above method for detecting slot format indication.

In an eighth aspect, embodiments of the present disclosure provide a computer-readable storage medium, which stores a program. The program is executed by a processor to implement steps of the above method for configuring slot format indication.

BRIEF DESCRIPTION OF THE DRAWINGS

In order to more clearly describe technical solutions of embodiments of the present disclosure, drawings required in the description of the embodiments of the present disclosure will be briefly introduced hereinafter. Obviously, the drawings in the following description are only some of the embodiments of the present disclosure. A person of ordinary skill in the art can obtain other drawings based on these drawings and without paying creative efforts.

DETAILED DESCRIPTION

To make objectives, technical solutions and advantages of embodiments of the present disclosure clearer, the technical solutions of the embodiments of the present disclosure will be described clearly and completely in conjunction with drawings of the embodiments of the present disclosure. Obviously, the described embodiments are a part of the embodiments of the present disclosure, but not all the embodiments. Based on the described embodiments of the present disclosure, all other embodiments obtained by persons of ordinary skill in the art shall fall within the protection scope of the present disclosure.

In view of problems that the resource overhead of SFI index information is large and the flexibility of configuring SFI index information is poor, embodiments of the present disclosure provide a method and a device for detecting slot format indication, and a method and a device for configuring slot format indication.

Figure 1:
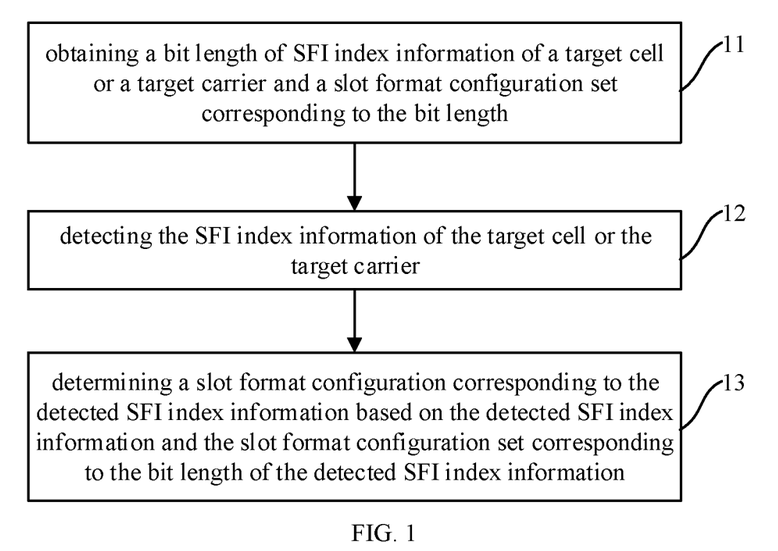
FIG. 1 is a schematic diagram of a method for detecting slot format indication according to a first embodiment of the present disclosure.

Referring to FIG. 1, a method for detecting slot format indication is provided according to a first embodiment of the present disclosure, which is applied to a terminal. The method includes the following steps 11 to 13.

Step 11 includes: obtaining a bit length of SFI index information of a target cell or a target carrier and a slot format configuration set corresponding to the bit length.

The target cell is a serving cell of the terminal, and the target carrier is a serving carrier of the terminal.

The SFI index information refers to an index used to indicate a slot format configuration, and one piece of SFI index information corresponds to one slot format configuration. Taking Table 1 as an example, the SFI index information is 0 to 255 in the table, and the slot format configuration is a slot structure, including positions of the DL part, the UL part, and the unknown part within the slot. The bit length of the SFI index information is at most 8 bits.

It is assumed that the bit length of the SFI index information of the target cell or the target carrier is 4, and the SFI index information with the bit length of 4 bits may be used to indicate 16 slot format configurations. Still taking Table 1 as an example, assuming that the bit length of the SFI index information of the target cell or the target carrier is 4, 16 slot format configurations can be selected from 256 slot format configurations in Table 1 as the slot format configuration set of the target cell or the target carrier. A specific selecting method may include arbitrarily selecting 16 slot format configurations, or may include selecting 16 slot format configurations in accordance with an agreement from the technical specification or configuration from a network-side device, which is not limited herein.

Step 12 includes: detecting the SFI index information of the target cell or the target carrier.

Step 13 includes: determining a slot format configuration corresponding to the detected SFI index information based on the detected SFI index information and the slot format configuration set corresponding to the bit length of the detected SFI index information.

In the embodiments of the present disclosure, SFI index information is configured based on the bit length of the SFI index information and the slot format configuration corresponding to the bit length, which can reduce the resource overhead of SFI index information and increase the flexibility of configuring the SFI index information.

In NRTDD systems, although 256 slot format configurations are defined in the technical specification, depending on different deployment scenarios and frequency bands, etc., a subset of all the slot format configurations may be only used in an actual system for dynamic DL/UL configuration, and all the 256 slot format configurations may not be used. Therefore, in an optional embodiment of the present disclosure, the bit length of the SFI index information of the target cell or the target carrier is smaller than or equal to 8 bits.

In an embodiment of the present disclosure, optionally, the SFI index information of the target cell or the target carrier may be carried by downlink control information (DCI).

Figure 2:
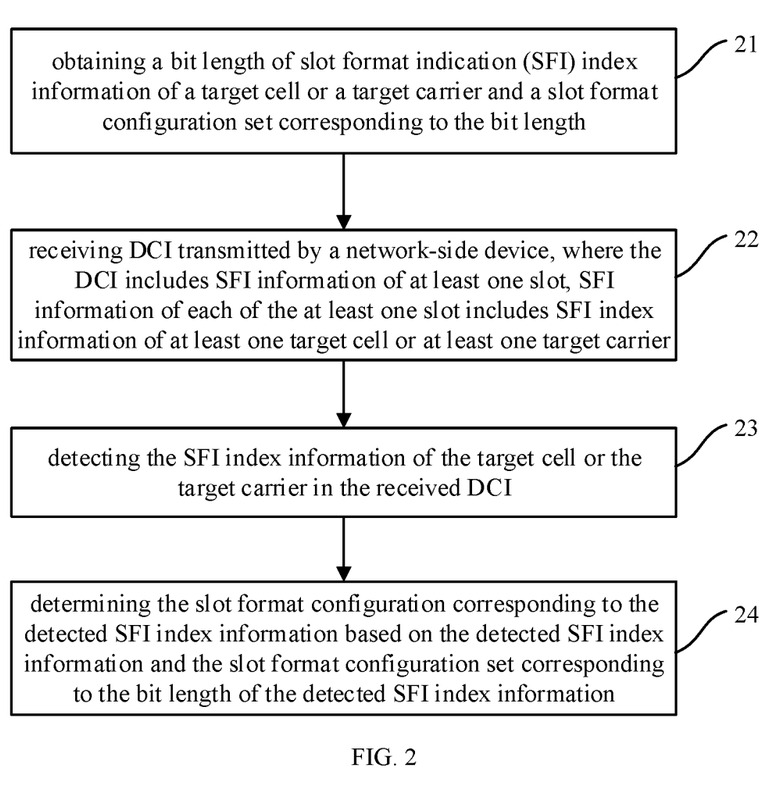
FIG. 2 is a schematic diagram of a method for detecting slot format indication according to a second embodiment of the present disclosure.

Referring to FIG. 2, a method for detecting slot format indication is provided according to a second embodiment of the present disclosure, which is applied to a terminal. The method includes the following steps 21 to 24.

Step 21 includes: obtaining a bit length of slot format indication (SFI) index information of a target cell or a target carrier and a slot format configuration set corresponding to the bit length.

Step 22 includes: receiving DCI transmitted by a network-side device, where the DCI includes SFI information of at least one slot, SFI information of each of the at least one slot includes SFI index information of at least one target cell or at least one target carrier, and a bit length of each piece of SFI index information is smaller than or equal to 8 bits.

In the embodiments of the present disclosure, one piece of DCI may include SFI information of one slot, or may include SFI information of multiple (greater than 1) slots. Moreover, SFI information of each slot may include one piece of SFI index information, or may include multiple pieces of (greater than 1) SFI index information. As an example, when the terminal supports carrier aggregation, and the carrier aggregation includes at least two carrier components, SFI information of one slot may include SFI index information of the at least two carrier components.

Step 23 includes: detecting the SFI index information of the target cell or the target carrier in the received DCI.

Step 24 includes: determining the slot format configuration corresponding to the detected SFI index information based on the detected SFI index information and the slot format configuration set corresponding to the bit length of the detected SFI index information.

According to requirements of system design (for example, payload size alignment of different DCI formats needs to be considered), the DCI payload size (that is, the payload size of the SFI information in the DCI) carrying SFI may be limited (such as 20 bits). Therefore, if one piece of SFI index information is indicated by using fixed 8 bits, SFI information of only a small amount of slots or carriers can be indicated in one piece of DCI. If the DCI payload size used to indicate SFI is enlarged, it may cause problems such as excessive PDCCH resource overhead and reduced PDCCH reliability.

In the embodiments of the present disclosure, when configuring SFI index information for the terminal, the network-side device does not need to fixedly use 8 bits to indicate one piece of SFI index information, and may configure the bit length of the SFI index information in accordance with requirements. Therefore, one piece of DCI can indicate SFI information of more slots or carriers, and there is no need to extend the DCI payload size used to indicate SFI, so as to avoid problems such as a large PDCCH resource overhead and reduced PDCCH reliability.

In an embodiment of the present disclosure, optionally, before detecting the SFI index information of the target cell or the target carrier in the received DCI, the method further includes: receiving SFI monitoring occasions and a payload size of SFI information in DCI corresponding to each of the SFI monitoring occasions that are configured by the network-side device, where each of the SFI monitoring occasions is able to detect at least one piece of DCI, and payload sizes of SFI information in pieces of DCI corresponding to different monitoring occasions are the same or different. The detecting the SFI index information of the target cell or the target carrier in the received DCI includes: detecting the SFI index information of the target cell or the target carrier in the received DCI according to the SFI monitoring occasions and the payload size of the SFI information in the DCI that are configured by the network-side device.

In an embodiment of the present disclosure, the SFI monitoring occasion is a monitoring periodicity of SFI. The payload size of the SFI information in the DCI refers to bits occupied by the SFI information in the DCI.

In the embodiment of the present disclosure, the network-side device configures the terminal with SFI monitoring occasions and a payload size of SFI information in DCI corresponding to each SFI monitoring occasion, and payload sizes of SFI information corresponding to different SFI monitoring occasions may be the same or may be different. Specifically, the payload size of SFI information in DCI in slot n may be 20 bits, the payload size of SFI information in DCI in slot n+2 may be 8 bits. The payload size of SFI information in DCI can be determined in accordance with a size of the SFI information requiring to be carried, thereby increasing the flexibility of DCI configuration.

In an embodiment of the present disclosure, the network-side device may configure SFI monitoring occasions and a payload size of SFI information in DCI corresponding to each SFI monitoring occasion for the terminal through radio resource control (RRC) signaling. Of course, in some other embodiments of the present disclosure, it is not excluded that other signaling are used to configure the terminal with SFI monitoring occasions and a payload size of SFI information in DCI corresponding to each SFI monitoring occasion.

In an embodiment of the present disclosure, the terminal may obtain the bit length of SFI index information of the target cell or the target carrier and the slot format configuration set corresponding to the bit length in the following manners.

(1) Receiving the bit length of the SFI index information of the target cell or the target carrier and the corresponding slot format configuration set that are configured by the network-side device.

That is, the network-side device transmits the bit length and the corresponding slot format configuration set to the terminal in explicit indication, that is, indicating which slot format configurations in all the sets in Table 1 can be used for the target cell or the target carrier.

Specifically, the network-side device may transmit, in a bitmap manner, the slot format configuration set corresponding to the bit length of the SFI index information of the target cell or the target carrier to the terminal.

Specifically, the network-side device may transmit, to the terminal through RRC signaling, the bit length of the SFI index information of the target cell or the target carrier and the corresponding slot format configuration set. Of course, in some other embodiments of the present disclosure, it is not excluded to use other signaling to transmit the bit length of the SFI index information of the target cell or the target carrier and the corresponding slot format configuration set to the terminal.

Additionally, the bit length of the SFI index information of the target cell or the target carrier and the corresponding slot format configuration set may be transmitted simultaneously or separately.

(2) Receiving the slot format configuration set corresponding to the SFI index information of the target cell or the target carrier configured by the network-side device, and determining the bit length of the SFI index information of the target cell or the target carrier according to the slot format configuration set corresponding to the SFI index information of the target cell or the target carrier configured by the network-side device.

That is, the network-side device configures only the slot format configuration set corresponding to the SFI index information of the target cell or the target carrier to the terminal. After receiving the slot format configuration set, the terminal determines the bit length of the SFI index information of the target cell or the target carrier according to the slot format configuration set.

That is, the network-side device transmits, to the terminal in explicit indication, the slot format configuration set corresponding to the SFI index information of the target cell or the target carrier to the terminal, that is, indicating which slot format configurations in all the sets in Table 1 can be used for the target cell or the target carrier.

Specifically, the network-side device may transmit, in a bitmap manner, the slot format configuration set corresponding to the SFI index information of the target cell or the target carrier to the terminal.

Specifically, the network-side device may transmit, to the terminal through RRC signaling, the slot format configuration set corresponding to the SFI index information of the target cell or the target carrier to the terminal. Of course, in some other embodiments of the present disclosure, other signaling is not excluded for transmission.

(3) Receiving the bit length of the SFI index information of the target cell or the target carrier configured by the network-side device, and determining the slot format configuration set corresponding to the bit length of the SFI index information of the target cell or the target carrier configured by the network-side device according to the bit length of the SFI index information of the target cell or the target carrier configured by the network-side device and a mapping relation between bit lengths of SFI index information and slot format configuration sets of the target cell or the target carrier, where the mapping relation is predefined by a technical specification.

That is to say, the mapping relation between bit lengths of SFI index information and slot format configuration sets is predefined by the technical specification. One bit length determines a slot format configuration set. The slot format configuration set may be all the sets in Table 1, or may also be a subset of all the sets in Table 1.

The network-side device only configures the terminal with the bit length of the SFI index information of the target cell or the target carrier. The terminal determines the corresponding slot format configuration set according to the bit length and the mapping relation predefined in the technical specification.

In an optional embodiment of the present disclosure, the network-side device configures, in units of a cell or a carrier, the bit length of the SFI index information of the target cell or the target carrier and/or the corresponding slot format configuration set.

In an embodiment of the present disclosure, the network-side device may support a self-carrier SFI indication or a cross-carrier SFI indication. The self-carrier SFI indication refers to transmitting DCI for indicating SFI information of a carrier on this carrier. The cross-carrier SFI indication may refer to transmitting DCI for indicating SFI information of a carrier on another carrier. The cross-carrier SFI indication may also refer to transmitting DCI on a carrier for indicating SFI information of multiple carriers, and the multiple carriers herein may or may not include the carrier transmitting the DCI.

In an embodiment of the present disclosure, the network-side device may support single slot SFI indication or multi-slot SFI indication. The single slot SFI indication may be that DCI transmitted on a slot indicates SFI information of the current slot, or that DCI transmitted on a slot indicates SFI information of another slot. The multi-slot SFI indication may be that DCI transmitted by a slot indicates SFI information of multiple slots. The multiple slots herein may include a slot transmitting the DCI or not; and the SFI information of multiple slots may be the same or different.

In an embodiment of the present disclosure, when the DCI includes SFI information of multiple slots and/or multiple carriers, the step of detecting the received SFI index information of the target cell or the target carrier in the DCI includes:

obtaining a bit position of SFI information of each slot and/or each carrier in the received DCI;

detecting the SFI information of each slot and/or each carrier according to the bit position of the SFI information of each slot and/or each carrier in the received DCI; and determining the SFI index information in the received DCI based on the detected SFI information of each slot and/or each carrier.

Optionally, in an embodiment of the present disclosure, the detecting the SFI information of each slot and/or each carrier according to the bit position of the SFI information of each slot and/or each carrier in the received DCI includes:

in a case that payload sizes of SFI information in DCI corresponding to different monitoring occasions are the same, obtaining SFI information of one slot and/or one carrier at a same bit position in each SFI monitoring occasion; and in a case that payload sizes of SFI information in DCI corresponding to different monitoring occasions are different, obtaining SFI information of one slot and/or one carrier at a same bit position or at different bit positions in each SFI monitoring occasion.

The method for detecting slot format indication in the embodiments of the present disclosure will be described below in conjunction with specific application scenarios.

Figure 3:
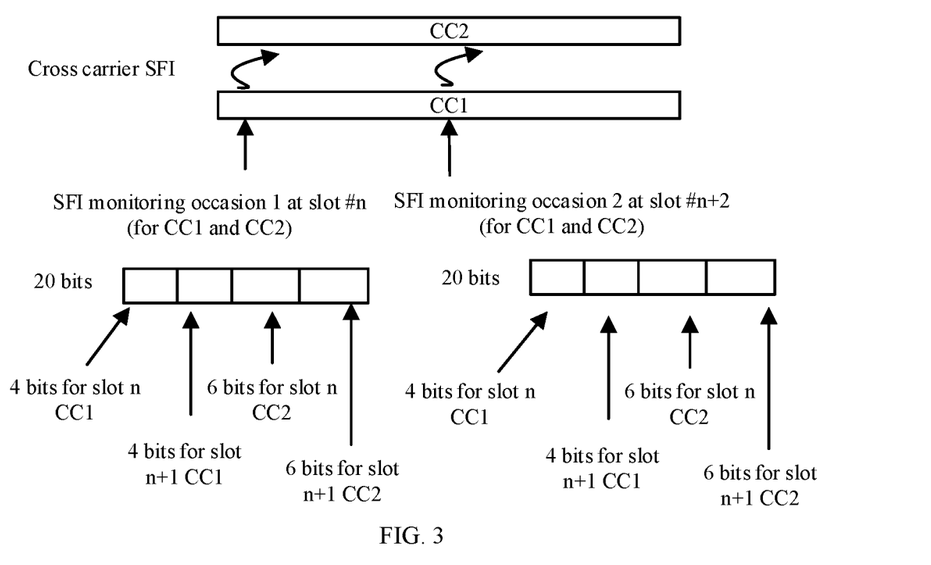
FIG. 3 is a schematic diagram of a method for detecting slot format indication according to a third embodiment of the present disclosure.

Reference is made to FIG. 3, which is a schematic diagram of a method for detecting slot format indication in a third embodiment of the present disclosure. In the embodiment of the present disclosure, a UE aggregates 2 carriers (CC1 and CC2), and DCI transmitted by a network-side device on CC1 carries SFI information of both CC1 and CC2, that is, the network-side device supports cross-carrier SFI indication. Meanwhile, one DCI includes SFI information of two slots, for example, the DCI on the left side includes SFI information of slot n and slot n+1, and the DCI on the right side includes SFI information of slot n+2 and slot n+3. Periodicities of SFI monitoring occasions corresponding to CC1 and CC2 are the same, both of which are 2 slots. The SFI index information of CC1 uses 4 bits length per slot, and the SFI index information of CC2 uses 6 bits length per slot. In the embodiment of the present disclosure, the UE performs blind detection of SFI information every 2 slots, and in each SFI monitoring occasion, the UE detects the same payload size of SFI information (the DCI payload size) (20 bits).

Figure 4:
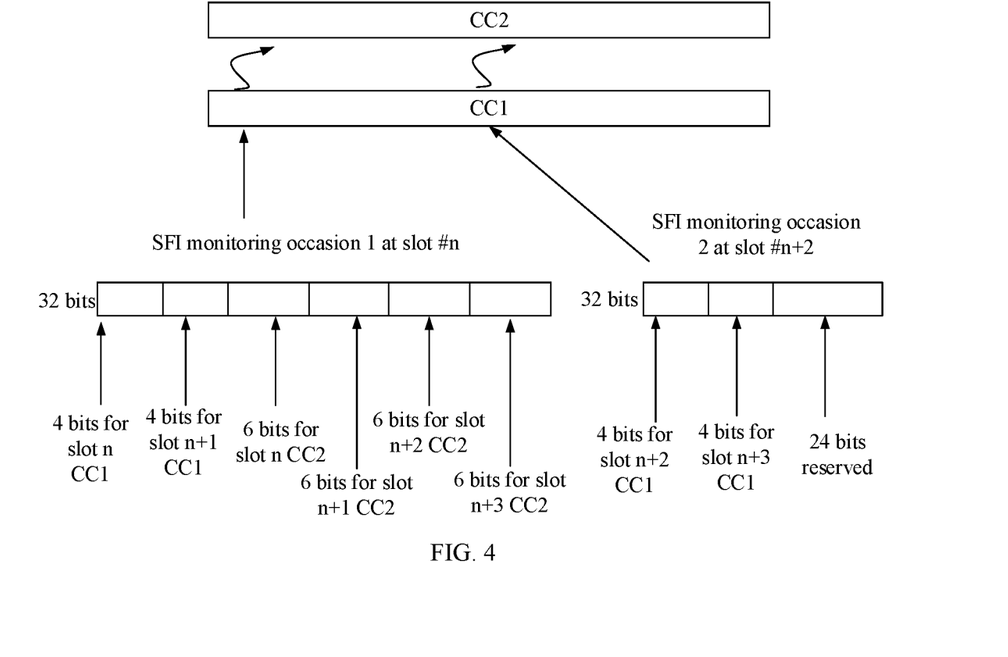
FIG. 4 is a schematic diagram of a method for detecting slot format indication according to a fourth embodiment of the present disclosure.

Reference is made to FIG. 4, which is a schematic diagram of a method for detecting slot format indication in a fourth embodiment of the present disclosure. In the embodiment of the present disclosure, a UE aggregates 2 carriers (CC1 and CC2), and DCI transmitted by a network-side device on CC1 carries SFI information of both CC1 and CC2, that is, the network-side device supports cross-carrier SFI indication. Meanwhile, one DCI includes SFI information of multiple slots, for example, the DCI on the left side includes SFI information of slot n, slot n+1, slot n+2 and slot n+3, and the DCI on the right side includes SFI information of slot n+2 and slot n+3. SFI monitoring occasions corresponding to CC1 and CC2 have different periodicities, a periodicity of the SFI monitoring occasion corresponding to CC1 is 2 slots, and a periodicity of the SFI monitoring occasion corresponding to CC2 is 4 slots. The SFI index information of CC1 uses 4 bits length per slot, and the SFI index information of CC2 uses 6 bits length per slot. In this embodiment of the present disclosure, the UE performs blind detection of SFI information every 2 slots, and the UE detects the same payload size of SFI information (the DCI payload size) (32 bits) in each SFI monitoring occasion. The 32-bit DCI detected by the UE in slot n includes SFI information of CC1 and CC2, while the 32-bit DCI detected by the UE in slot n+2 only includes SFI information (8 bits) of CC1, and the remaining 24 bits are reserved bits.

Figure 5:
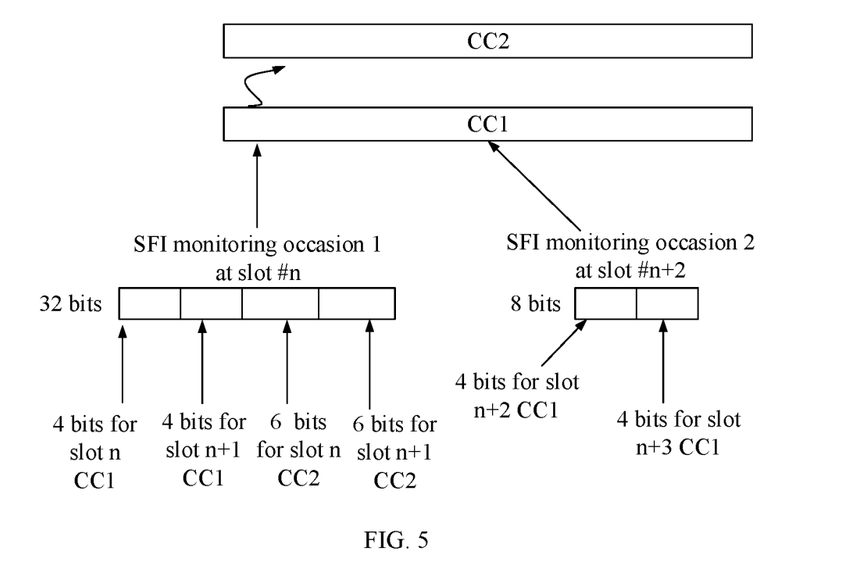
FIG. 5 is a schematic diagram of a method for detecting slot format indication according to a fifth embodiment of the present disclosure.

Reference is made to FIG. 5, which is a schematic diagram of a method for detecting slot format indication according to a fifth embodiment of the present disclosure. In the embodiment of the present disclosure, a UE aggregates 2 carriers (CC1 and CC2), and DCI transmitted by a network-side device on CC1 carries SFI information of both CC1 and CC2, that is, the network-side device supports cross-carrier SFI indication. Meanwhile, one DCI includes SFI information of multiple slots, for example, the DCI on the left side includes SFI information of slot n and slot n+1, and the DCI on the right side includes SFI information of slot n+2 and slot n+3. A periodicity of an SFI monitoring occasion corresponding to CC1 is different from a periodicity of an SFI monitoring occasion corresponding to CC2, the periodicity of the SFI monitoring occasion corresponding to CC1 is 2 slots, and the periodicity of the SFI monitoring occasion corresponding to CC2 is 4 slot. The SFI index information of CC1 uses 4 bits length per slot, and the SFI index information of CC2 uses 6 bits length per slot. In this embodiment of the present disclosure, the UE performs blind detection of SFI information every 2 slots, the UE detects different payload sizes of SFI information (DCI payload size) in different SFI monitoring occasions. The DCI with 32 bits detected by the UE in slot n includes SFI information of both CC1 and CC2, while the DCI with 8 bits detected by the UE in slot n+2 only includes SFI information of CC1.

Figure 6:
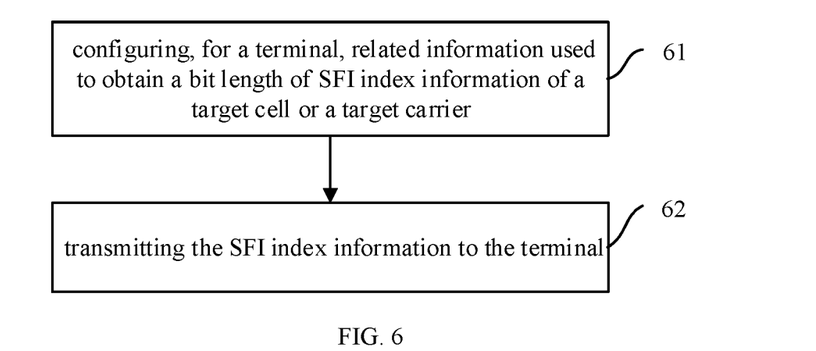
FIG. 6 is a schematic diagram of a method for configuring slot format indication according to a sixth embodiment of the present disclosure.

Referring to FIG. 6, a method for configuring slot format indication is further provided by an embodiment of the present disclosure, which is applied to a network-side device, and includes the following steps 61 and 62:

step 61: configuring, for a terminal, related information used to obtain a bit length of SFI index information of a target cell or a target carrier; and step 62: transmitting the SFI index information to the terminal.

In the embodiments of the present disclosure, SFI index information is configured according to the bit length of the SFI index information and a slot format configuration corresponding to the bit length, which can reduce the resource overhead of the SFI index information and increase the flexibility of configuring the SFI index information.

Optionally, the bit length is smaller than or equal to 8 bits.

Optionally, the transmitting the SFI index information to the terminal includes: transmitting DCI to the terminal, where the DCI includes SFI information of at least one slot, SFI information of each of the at least one slot includes SFI index information of at least one target cell or at least one target carrier, and a bit length of SFI index information of each of the at least one target cell or the at least one target carrier is smaller than or equal to 8 bits.

Optionally, the method for configuring slot format indication further includes: configuring, for the terminal, SFI monitoring occasions and a payload size of SFI information in DCI corresponding to each of the SFI monitoring occasions, where each of the SFI monitoring occasions is used to detect at least one DCI, and payload sizes of SFI information in DCI corresponding to different monitoring occasions are the same or different.

Optionally, the configuring, for the terminal, the SFI monitoring occasions and the payload size of the SFI information in the DCI corresponding to each of the SFI monitoring occasions includes: configuring, for the terminal through a radio resource control (RRC) signaling, the SFI monitoring occasions and the payload size of the SFI information in the DCI corresponding to each of the SFI monitoring occasions.

Optionally, before configuring, for the terminal, the related information used to obtain the bit length of the SFI index information of the target cell or the target carrier, the method further includes: determining the related information used to obtain the bit length of the SFI index information of the target cell or the target carrier, where the related information used to obtain the bit length of the SFI index information of the target cell or the target carrier includes the bit length of the SFI index information of the target cell or the target carrier, and/or a slot format configuration set corresponding to the bit length of the SFI index information of the target cell or the target carrier.

Optionally, the related information used to obtain the bit length of the SFI index information of the target cell or the target carrier is configured through a radio resource control (RRC) signaling.

Optionally, the configuring, for the terminal, the related information used to obtain the bit length of the SFI index information of the target cell or the target carrier includes:

configuring, per cell, the related information used to obtain the bit length of the SFI index information of the target cell for the terminal; or configuring, per carrier, the related information used to obtain the bit length of the SFI index information of the target cell or the target carrier for the terminal.

Optionally, the DCI includes SFI information of a plurality of slots and/or a plurality of carriers.

Figure 7:
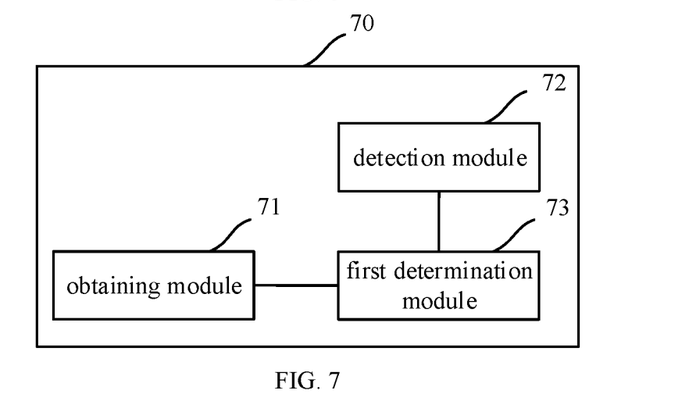
FIG. 7 is a schematic diagram of a terminal according to a seventh embodiment of the present disclosure.

Referring to FIG. 7, an embodiment of the present disclosure further provides a terminal 70, which includes an obtaining module 71, a detection module 72, and a first determination module 73.

The obtaining module 71 is configured to obtain a bit length of slot format indication (SFI) index information of a target cell or a target carrier and a slot format configuration set corresponding to the bit length.

The detection module 72 is configured to detect the SFI index information of the target cell or the target carrier.

The first determination module 73 is configured to determine a slot format configuration corresponding to the detected SFI index information based on the detected SFI index information and the slot format configuration set corresponding to the bit length corresponding to the detected SFI index information.

In the embodiments of the present disclosure, SFI index information is configured according to the bit length of the SFI index information and a slot format configuration corresponding to the bit length, which can reduce the resource overhead of the SFI index information and increase the flexibility of configuring the SFI index information.

Optionally, the bit length is smaller than or equal to 8 bits.

Optionally, the detection module 72 is configured to receive DCI transmitted by a network-side device, where the DCI includes SFI information of at least one slot, and SFI information of each of the at least one slot includes SFI index information of at least one target cell or at least one target carrier; and detect the SFI index information of the target cell or the target carrier in the received DCI.

Optionally, the terminal further includes: a first reception module, configured to receive SFI monitoring occasions and a payload size of the SFI information in the DCI corresponding to each of the SFI monitoring occasions that are configured by the network-side device, where each of the SFI monitoring occasions is used to detect at least one DCI, and payload sizes of SFI information in DCI corresponding to different monitoring occasions are the same or different. The detection module is configured to detect the SFI index information of the target cell or the target carrier in the received DCI according to the SFI monitoring occasions and the payload size of the SFI information in the DCI that are configured by the network-side device.

Optionally, the first reception module is configured to receive the SFI monitoring occasions and the payload size of the SFI information in the DCI corresponding to each of the SFI monitoring occasions that are configured by the network-side device through a radio resource control (RRC) signaling.

Optionally, the obtaining module 71 is configured to receive the bit length of the SFI index information of the target cell or the target carrier and the corresponding slot format configuration set that are configured by the network-side device; or the obtaining module 71 is configured to receive the slot format configuration set corresponding to the SFI index information of the target cell or the target carrier configured by the network-side device, and determine the bit length of the SFI index information of the target cell or the target carrier according to the slot format configuration set corresponding to the SFI index information of the target cell or the target carrier configured by the network-side device; or the obtaining module 71 is configured to receive the bit length of the SFI index information of the target cell or the target carrier configured by the network-side device, and determine the slot format configuration set corresponding to the bit length of the SFI index information of the target cell or the target carrier configured by the network-side device according to the bit length of the SFI index information of the target cell or the target carrier configured by the network-side device and a mapping relation between the bit length of the SFI index information and the slot format configuration set, where the mapping relation is predefined by a technical specification.

Optionally, the bit length of the SFI index information of the target cell or the target carrier, and/or the corresponding slot format configuration set is configured through RRC signaling.

Optionally, when the DCI includes SFI information of a plurality of slots and/or a plurality of carriers, the detection module 72 is configured to:

obtain a bit position of SFI information of each slot and/or each carrier in the received DCI;

detect the SFI information of each slot and/or each carrier according to the bit position of the SFI information of each slot and/or each carrier in the received DCI; and determine the SFI index information in the received DCI based on the detected SFI information of each slot and/or each carrier.

Optionally, the detection module 72 is configured to:

in a case that payload sizes of SFI information in DCI corresponding to different monitoring occasions are the same, obtain the SFI information of one slot and/or one carrier at a same bit position in all the SFI monitoring occasions; and in a case that payload sizes of SFI information in DCI corresponding to different monitoring occasions are different, obtain the SFI information of one slot and/or one carrier at a same bit position or at different bit positions in all the SFI monitoring occasions.

The terminal in the embodiments of the present disclosure may be a wireless terminal or a wired terminal. The wireless terminal may be a device that provides voice and/or other service data connectivity to a user, a handheld device with a wireless connection function, or other processing devices connected to a wireless modem. A wireless terminal may communicate with one or more core networks via a radio access network (RAN for short). The wireless terminal may be a mobile terminal, such as a mobile phone (or referred to as "cellular" phone) and a computer including a mobile terminal, which may be, for example, a portable, pocket-sized, hand-held, computer built-in or vehicle-mounted mobile device, and exchanges language and/or data with a wireless access network. For example, the terminal may be a personal communication service (PCS) phone, a cordless phone, a session initiation protocol (SIP) phone, a wireless local loop (WLL) station, and a personal digital assistant (PDA) and other devices. The wireless terminal may also be referred to as a system, a subscriber unit, a subscriber station, a mobile station, a remote station, a remote terminal, an access terminal, a user terminal, a user agent, a terminal user device or user equipment, which are not limited herein.

Figure 8:
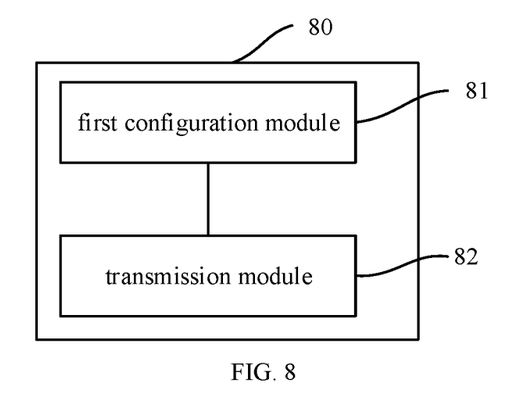
FIG. 8 is a schematic diagram of a network-side device according to an eight embodiment of the present disclosure.

Referring to FIG. 8, an embodiment of the present disclosure further provides a network-side device 80. The network-side device 80 includes a first configuration module 81 and a transmission module 82.

The first configuration module 81 is configured to configure, for a terminal, related information used to obtain a bit length of SFI index information of a target cell or a target carrier; and The transmission module 82 is configured to transmit the SFI index information to the terminal.

Optionally, the bit length is smaller than or equal to 8 bits.

Optionally, the transmission module 82 is configured to transmit DCI to the terminal, where the DCI includes SFI information of at least one slot, SFI information of each of the at least one slot includes SFI index information of at least one target cell or at least one target carrier, and a bit length of SFI index information of each of the at least one target cell or the at least one target carrier is smaller than or equal to 8 bits.

Optionally, the network-side device further includes: a second configuration module, configured to configure, for the terminal, SFI monitoring occasions and a payload size of SFI information in DCI corresponding to each of the SFI monitoring occasions, where each of the SFI monitoring occasions is used to detect at least one DCI, and payload sizes of SFI information in DCI corresponding to different monitoring occasions are the same or different.

Optionally, the second configuration module is configured to configure, for the terminal through RRC signaling, the SFI monitoring occasions and the payload size of the SFI information in the DCI corresponding to each of the SFI monitoring occasions.

Optionally, the network-side device further includes: a first determination module, configured to determine the related information used to obtain the bit length of the SFI index information of the target cell or the target carrier, where the related information used to obtain the bit length of the SFI index information of the target cell or the target carrier includes the bit length of the SFI index information of the target cell or the target carrier, and/or a slot format configuration set corresponding to the bit length of the SFI index information of the target cell or the target carrier.

Optionally, the related information used to obtain the bit length of the SFI index information of the target cell or the target carrier is configured through RRC signaling.

Optionally, the first configuration module is configured to configure, per cell, the related information used to obtain the bit length of the SFI index information of the target cell for the terminal; or the first configuration module is configured to configure, per carrier, the related information used to obtain the bit length of the SFI index information of the target cell or the target carrier for the terminal.

Optionally, the DCI includes SFI information of a plurality of slots and/or a plurality of carriers.

The network-side device in the embodiments of the present disclosure may be a global system of mobile communication (GSM), a base transceiver station (BTS) in code division multiple access (CDMA), a base station (NodeB, NB for short) in wideband code division multiple access (WCDMA), an evolutional Node B (eNB or eNodeB for short) in LTE, a relay station or an access point, or a base station in a future 5G network, etc., which is not limited herein.

Embodiments of the present disclosure further provide a terminal, including a processor, a memory, and a computer program stored on the memory and executable on the processor. When executing the computer program, the processor is configured to implement steps of the above-mentioned method for detecting slot format indication.

Embodiments of the present disclosure further provide a network-side device, including a processor, a memory, and a computer program stored on the memory and executable on the processor. When executing the computer program, the processor is configured to implement steps of the above-mentioned method for configuring slot format indication.

Embodiments of the present disclosure further provide a computer-readable storage medium that stores a computer program, and when the computer program is executed by a processor, steps of the above-mentioned method for detecting slot format indication are implemented.

Embodiments of the present disclosure further provide a computer-readable storage medium that stores a computer program, and when the computer program is executed by a processor, steps of the above-mentioned method for configuring slot format indication are implemented.

The computer-readable storage medium may be, for example, a read-only memory (ROM for short), a random access memory (RAM for short), a magnetic disk or an optical disk.

Figure 9:
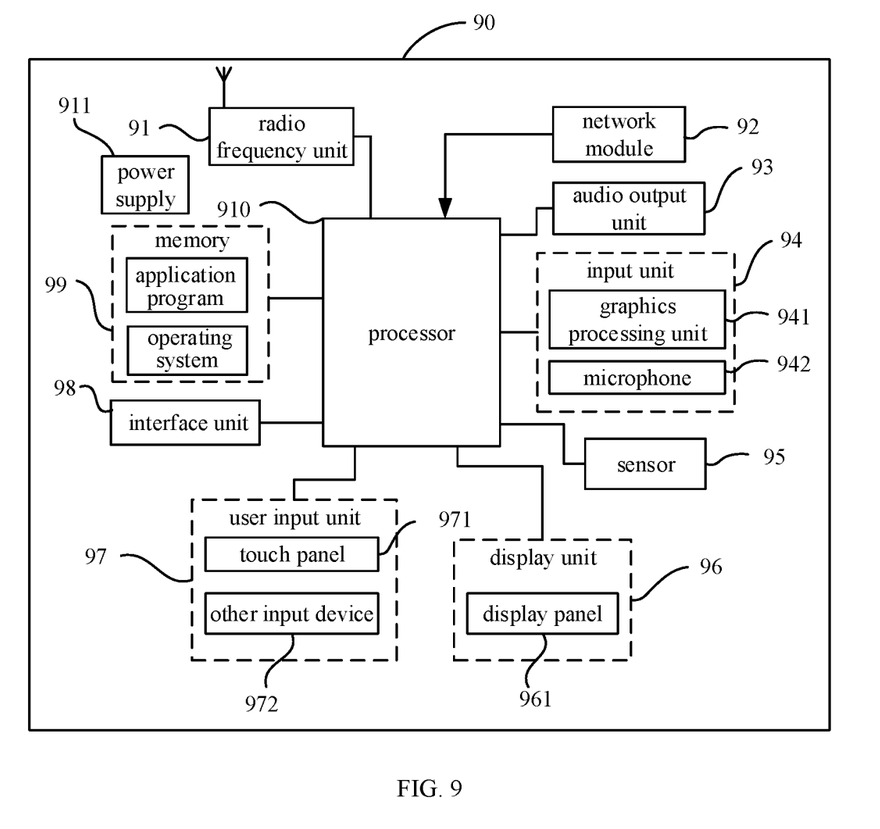
FIG. 9 is a schematic diagram of a terminal according to a ninth embodiment of the present disclosure.

Referring to FIG. 9, an embodiment of the present disclosure further provides a terminal 90. The mobile terminal 90 includes but is not limited to: a radio frequency unit 91, a network module 92, an audio output unit 93, an input unit 94, a sensor 95, a display unit 96, a user input unit 97, an interface unit 98, a memory 99, a processor 910, a power supply 911 and other components. Those skilled in the art can understand that the structure of the mobile terminal shown in FIG. 9 does not constitute a limitation to the mobile terminal, and the mobile terminal may include more or fewer components than those shown in the figure, or may have some components combined, or may use a different arrangement of the components. In the embodiments of the present disclosure, the terminal includes, but not limited to, a mobile phone, a tablet computer, a notebook computer, a palmtop computer, a vehicle-mounted terminal, a wearable device, a pedometer, or the like.

The processor 910 is configured to obtain a bit length of slot format indication (SFI) index information of a target cell or a target carrier and a slot format configuration set corresponding to the bit length; detect the SFI index information of the target cell or the target carrier; and determine a slot format configuration corresponding to the detected SFI index information based on the detected SFI index information and the slot format configuration set corresponding to the bit length corresponding to the detected SFI index information.

In the embodiments of the present disclosure, SFI index information is configured based on the bit length of the SFI index information and the slot format configuration corresponding to the bit length, which can reduce the resource overhead of SFI index information and increase the flexibility of configuring the SFI index information.

It should be understood that, in the embodiments of the present disclosure, the radio frequency unit 91 may be configured to receive and send information, or to receive and send signals during a call. Specifically, the radio frequency unit 91 delivers downlink data received from a base station to the processor 910 for processing, and further transmits uplink data to the base station. Generally, the radio frequency unit 91 includes, but not limited to, an antenna, at least one amplifier, a transceiver, a coupler, a low noise amplifier, a duplexer. In addition, the radio frequency unit 91 may communicate with a network or other devices via a wireless communication system.

The terminal provides users with wireless broadband Internet access via the network module 92, such as helping users send and receive emails, browse web pages and access streaming media.

The audio output unit 93 may convert audio data received by the radio frequency unit 91 or the network module 92 or stored in the memory 99 into audio signals and output them as sound. Moreover, the audio output unit 93 may provide audio output (for example, call signal reception sound, message reception sound, etc.) related to a specific function performed by the mobile terminal 90. The audio output unit 93 includes a speaker, a buzzer, a receiver, or the like.

The input unit 94 is configured to receive audio or video signals. The input unit 94 may include a graphics processing unit (GPU) 941 and a microphone 942. The GPU 941 is configured to process image data of still pictures or videos obtained via an image capture device (such as a camera) in an image capture mode or a video capture mode. The processed image frames may be displayed on the display unit 96. The image frames processed by the graphics processor 941 may be stored in the memory 99 (or other storage medium) or transmitted via the radio frequency unit 91 or the network module 92. The microphone 942 may receive sound, and may process the sound into audio data. The processed audio data may be converted into a format that can be transmitted to a mobile communication base station for outputting via the radio frequency unit 91 in the case of a telephone call mode.

The mobile terminal 90 further includes at least one sensor 95, such as an optical sensor, a motion sensor, or other sensors. Specifically, the optical sensor includes an ambient light sensor and a proximity sensor. The ambient light sensor may be configured to adjust brightness of the display panel 961 according to the brightness of the ambient light, and the proximity sensor may close the display panel 961 and/or backlight when the mobile terminal 90 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the terminal (such as switching of horizontal and vertical screen, a correlated game, magnetometer pose calibration), a function about vibration recognition (such as pedometer, tapping). The sensor 95 may also include a fingerprint sensor, a pressure sensor, an iris sensor, a molecular sensor, a gyroscope, a barometer, a hygrometer, a thermometer, an infrared sensors, or the like, which are not described herein.

The display unit 96 is configured to display information inputted by the user or information provided to the user. The display unit 96 may include a display panel 961. The display panel 961 may be configured in the form of a liquid crystal display (LCD), an organic light-emitting diode (OLED), or the like.

The user input unit 97 may be configured to receive inputted numeric or character information, and generate key signal inputs related to user settings and function control of the mobile terminal. Specifically, the user input unit 97 includes a touch panel 971 and other input device 972. The touch panel 971, also known as a touch screen, may collect a touch operation of a user thereon or thereby (for example, an operation on or around the touch panel 971 that is made by a user with a finger, a touch pen or any other suitable object or accessory). The touch panel 971 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 910. The touch controller may receive a command from by the processor 910 and execute the command. In addition, the touch panel 971 may be implemented in various types such as a resistive panel, a capacitive panel, an infrared panel, or a surface acoustic wave panel. In addition to the touch panel 971, the user input unit 97 may include other input device 972. Specifically, the other input device 972 may include, but not limited to, a physical keyboard, a function key (such as a volume control key, a switch key), a trackball, a mouse, or a joystick, which are not described herein.

Further, the display panel 961 may be covered by the touch panel 971. When the touch panel 971 detects a touch operation on or near the touch panel 971, the touch panel 971 transmits the touch operation to the processor 910 to determine the type of the touch event, and the processor 910 provides a corresponding visual output on the display panel 961 according to the type of touch event. Although the touch panel 971 and the display panel 961 are implemented as two independent components to implement the input and output functions of the mobile terminal in FIG. 12, in some embodiments, the touch panel 971 and the display panel 961 may be integrated to implement the input and output functions of the mobile terminal, which are not limited herein.

The interface unit 98 is an interface through which an external device is connected to the mobile terminal 90. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 98 may be configured to receive input (e.g., data information, power, etc.) from an external device and transmit the received input to one or more elements in the mobile terminal 90, or may be configured to transmit data between the mobile terminal 90 and the external device.

The memory 99 may be configured to store software programs and various data. The memory 99 may mainly include a program storage area and a data storage area, where the program storage area may store an operating system, an application program (such as a sound playback function, an image playback function, etc.) required for at least one function; the data storage area may store data (such as audio data, a phone book, etc.) created according to the use of the mobile phone. In addition, the memory 99 may include a high-speed random access memory, and may further include a non-volatile memory, such as at least one magnetic disk storage device, a flash memory device, or other volatile solid-state storage device.

The processor 910 is a control center of the mobile terminal, which uses various interfaces and lines to connect various parts of the entire terminal. The processor 910 runs or executes software programs and/or modules stored in the memory 99 and calls data stored in the memory 99, to execute various functions of the terminal and process data, so as to monitor the terminal as a whole. The processor 910 may include one or more processing units. Optionally, the processor 910 may integrate an application processor and a modem processor. The application processor mainly processes an operating system, a user interface, an application program, etc., and the modem processor mainly processes wireless communications. It can be understood that the foregoing modem processor may not be integrated into the processor 910.

The mobile terminal 90 may further include a power supply 911 (such as a battery) for supplying power to various components. Optionally, the power supply 911 may be logically connected to the processor 910 through a power management system, so as to implement functions, such as management of charging and discharging, and power consumption management, via the power management system.

In addition, the mobile terminal 90 includes some functional modules that are not shown, which are not described herein again.

Figure 10:
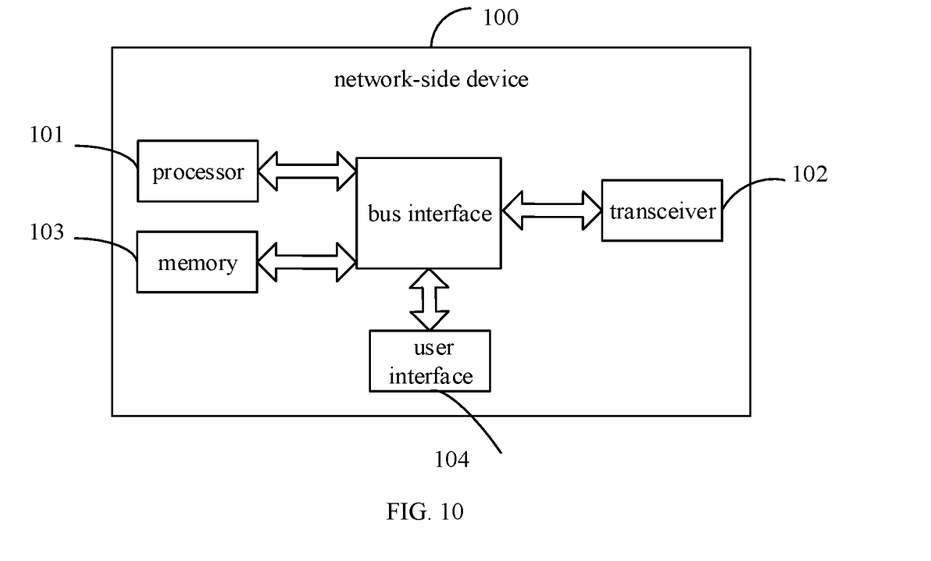
FIG. 10 is a schematic diagram of a network-side device according to a tenth embodiment of the present disclosure.

Referring to FIG. 10, an embodiment of the present disclosure further provides a network-side device 100. The network-side device 100 includes: a processor 101, a transceiver 102, a memory 103, a user interface 104 and a bus interface.

In an embodiment of the present disclosure, the network-side device 100 further includes a computer program stored on the memory 103 and executable on the processor 101. When executing the computer program, the processor 101 is configured to implement the following steps:

configuring, for a terminal, related information used to obtain a bit length of SFI index information of a target cell or a target carrier; and transmitting the SFI index information to the terminal.

In FIG. 10, the bus architecture may include any number of interconnected buses and bridges, specifically, to link various circuits such as one or more processors represented by the processor 101 and a memory represented by the memory 103. The bus architecture can also link various other circuits such as a peripheral device, a voltage regulator, and a power management circuits, etc., which are well known in the art, and therefore, they will not be further described in this specification. The bus interface provides an interface. The transceiver 102 may be a plurality of elements, including a transmitter and a receiver, and provides a unit for communicating with various other devices on a transmission medium. For different user devices, the user interface 104 may also be an interface that can be externally connected to the required device. The connected devices include but are not limited to a keypad, a display, a speaker, a microphone, a joystick, and the like.

The processor 101 is responsible for managing the bus architecture and general processing, and the memory 103 may store data used by the processor 101 when performing operations.

Optionally, the bit length is smaller than or equal to 8 bits.

Optionally, the step of transmitting the SFI index information to the terminal includes: transmitting DCI to the terminal, where the DCI includes SFI information of at least one slot, SFI information of each of the at least one slot includes SFI index information of at least one target cell or at least one target carrier, and a bit length of SFI index information of each of the at least one target cell or the at least one target carrier is smaller than or equal to 8 bits.

Optionally, when executing the computer program, the processor 101 is further configured to implement the following steps: configuring, for the terminal, SFI monitoring occasions and a payload size of the SFI information in the DCI corresponding to each of the SFI monitoring occasions, where each of the SFI monitoring occasions is used to detect at least one DCI, and payload sizes of SFI information in DCI corresponding to different monitoring occasions are the same or different.

Optionally, the step of configuring, for the terminal, the SFI monitoring occasions and the payload size of the SFI information in the DCI corresponding to each of the SFI monitoring occasions includes: configuring, for the terminal through RRC signaling, the SFI monitoring occasions and the payload size of the SFI information in the DCI corresponding to each of the SFI monitoring occasions.

Optionally, prior to the step of configuring, for the terminal, the related information used to obtain the bit length of the SFI index information of the target cell or the target carrier, the method further includes: determining the related information used to obtain the bit length of the SFI index information of the target cell or the target carrier, where the related information used to obtain the bit length of the SFI index information of the target cell or the target carrier includes the bit length of the SFI index information of the target cell or the target carrier, and/or a slot format configuration set corresponding to the bit length of the SFI index information of the target cell or the target carrier.

Optionally, the related information used to obtain the bit length of the SFI index information of the target cell or the target carrier is configured through RRC signaling.

Optionally, the configuring, for the terminal, the related information used to obtain the bit length of the SFI index information of the target cell or the target carrier includes:

configuring, in units of cell, the related information used to obtain the bit length of the SFI index information of the target cell for the terminal; or configuring, in units of carrier, the related information used to obtain a bit length of the SFI index information of the target cell or the target carrier for the terminal.

Optionally, the DCI includes SFI information of a plurality of slots and/or a plurality of carriers.

The network-side device according to the embodiments of the present disclosure configures SFI index information based on the bit length of the SFI index information and the slot format configuration corresponding to the bit length, which can reduce the resource overhead of SFI index information and increase the flexibility of configuring the SFI index information.

Those skilled in the art may appreciate that the units and algorithm steps of the various examples described in conjunction with the embodiments of the present disclosure can be implemented by electronic hardware or a combination of computer software and electronic hardware. Whether these functions are performed in hardware or software depends on the specific application and design constraints of the technical solutions. Those skilled in the art can use different methods to implement the described functions for each particular application, but such implementations should not be considered as going beyond the scope of the present disclosure.

Those skilled in the art can clearly understand that for convenience and clarification, operation procedures of the systems, devices and units described hereinabove may refer to the corresponding procedures in the above-mentioned method embodiments, and thus will not be particularly defined herein.

It should be understood that in the embodiments of the present application, the disclosed apparatus and method may be implemented in other manners. For example, the apparatus embodiments described above are merely illustrative. For example, the division of the units is only a logical function division, and in practical implementations, there may be another manner of division. For example, multiple units or components may be combined or integrated into another system, or some features can be ignored or not implemented. In addition, the mutual coupling or direct coupling or communication connection shown or discussed may be implemented with some interfaces, and indirect coupling or communication connection between apparatuses or units may be electrical, mechanical or in other forms.

The units described as separate components may or may not be physically separated, and the components shown as units may or may not be physical units, that is, they may be located in one place or distributed to multiple network units. Some or all of the units may be selected according to practical needs to achieve the objective of the technical solutions of the embodiments.

In addition, functional units in various embodiments of the present disclosure may be integrated into one processing unit, or each unit may exist physically separately, or two or more units may be integrated into one unit.

In a case that the functions are implemented in the form of a software functional unit which is sold or used as a standalone product, the product may be stored in a computer-readable storage medium. Based on such understanding, the essence or the portion of the technical solutions of the present disclosure that contributes to the prior art may be embodied in the form of a software product. The computer software product is stored in a storage medium, which includes instructions that cause a computer device (which may be a personal computer, a server or a network device) to perform all or part of the steps of the methods according to the embodiments of the present disclosure. The foregoing storage medium may include any storage medium that can store program codes, such as a USB flash drive, a mobile hard disk, a ROM, a RAM, a magnetic disk, or an optical disk.

The above-described embodiments are merely some specific embodiments of the present disclosure, but the present disclosure is not limited thereto. A person skilled in the art can easily think of modifications and substitutions within technical principles of the present disclosure, and these modifications and substitutions shall fall within the protection scope of the present disclosure. Therefore, the protection scope of the present disclosure shall be subjected to the claims.

What is claimed is:

1. A method for detecting slot format indication, applied to a terminal, comprising:
obtaining a bit length of slot format indication (SFI) index information of a target cell or a target carrier and a slot format configuration set corresponding to the bit length;
detecting the SFI index information of the target cell or the target carrier; and
determining a slot format configuration corresponding to the detected SFI index information based on the detected SFI index information and the slot format configuration set corresponding to the bit length of the detected SFI index information.

2. The method for detecting slot format indication according to claim 1, wherein the detecting the SFI index information of the target cell or the target carrier comprises:
receiving downlink control information (DCI) transmitted by a network-side device, wherein the DCI comprises SFI information of at least one slot, and SFI information of each of the at least one slot comprises SFI index information of at least one target cell or at least one target carrier; and
detecting the SFI index information of the target cell or the target carrier in the received DCI.

3. The method for detecting slot format indication according to claim 1, wherein the obtaining the bit length of the SFI index information of the target cell or the target carrier and the slot format configuration set corresponding to the bit length comprises:
receiving the bit length of the SFI index information of the target cell or the target carrier and the corresponding slot format configuration set that are configured by the network-side device; or
receiving the slot format configuration set corresponding to the SFI index information of the target cell or the target carrier configured by the network-side device, and determining the bit length of the SFI index information of the target cell or the target carrier according to the slot format configuration set corresponding to the SFI index information of the target cell or the target carrier configured by the network-side device; or
receiving the bit length of the SFI index information of the target cell or the target carrier configured by the network-side device, and determining the slot format configuration set corresponding to the bit length of the SFI index information of the target cell or the target carrier configured by the network-side device, according to the bit length of the SFI index information of the target cell or the target carrier configured by the network-side device and a mapping relation between the bit length of the SFI index information and the slot format configuration set, wherein the mapping relation is predefined by a technical specification.

4. The method for detecting slot format indication according to claim 3, wherein the bit length of the SFI index information of the target cell or the target carrier, and/or the corresponding slot format configuration set is configured through a radio resource control (RRC) signaling.

5. The method for detecting slot format indication according to claim 2, wherein, before detecting the SFI index information of the target cell or the target carrier in the received DCI, the method further comprises:
receiving SFI monitoring occasions and a payload size of SFI information in DCI corresponding to each of the SFI monitoring occasions that are configured by the network-side device, wherein each of the SFI monitoring occasions is used to detect at least one DCI, and payload sizes of SFI information in DCI corresponding to different monitoring occasions are the same or different; and
wherein the detecting the SFI index information of the target cell or the target carrier in the received DCI comprises:
detecting the SFI index information of the target cell or the target carrier in the received DCI according to the SFI monitoring occasions and the payload size of the SFI information in the DCI that are configured by the network-side device.

6. The method for detecting slot format indication according to claim 5, wherein the receiving the SFI monitoring occasions and the payload size of the SFI information in the DCI corresponding to each of the SFI monitoring occasions that are configured by the network-side device comprises:
receiving the SFI monitoring occasions and the payload size of the SFI information in the DCI corresponding to each of the SFI monitoring occasions that are configured by the network-side device through a radio resource control (RRC) signaling.

7. The method for detecting slot format indication according to claim 5, wherein, when the DCI comprises SFI information of a plurality of slots and/or a plurality of carriers, the detecting the SFI index information of the target cell or the target carrier in the received DCI comprises:
obtaining a bit position of SFI information of each slot and/or each carrier in the received DCI;
detecting the SFI information of each slot and/or each carrier according to the bit position of the SFI information of each slot and/or each carrier in the received DCI; and
determining the SFI index information in the received DCI based on the detected SFI information of each slot and/or each carrier.

8. The method for detecting slot format indication according to claim 7, wherein the detecting the SFI information of each slot and/or each carrier according to the bit position of the SFI information of each slot and/or each carrier in the received DCI comprises:
in a case that payload sizes of SFI information in DCI corresponding to different monitoring occasions are the same, obtaining SFI information of one slot and/or one carrier at a same bit position in all the SFI monitoring occasions; and
in a case that payload sizes of SFI information in DCI corresponding to different monitoring occasions are different, obtaining SFI information of one slot and/or one carrier at a same bit position or at different bit positions in all the SFI monitoring occasions.

9. A method for configuring slot format indication, applied to a network-side device, comprising:
configuring, for a terminal, related information used to obtain a bit length of slot format indication (SFI) index information of a target cell or a target carrier; and
transmitting the SFI index information to the terminal.

10. The method for configuring slot format indication according to claim 9, wherein the transmitting the SFI index information to the terminal comprises:
transmitting downlink control information (DCI) to the terminal, wherein the DCI comprises SFI information of at least one slot, SFI information of each of the at least one slot comprises SFI index information of at least one target cell or at least one target carrier, and a bit length of SFI index information of each of the at least one target cell or the at least one target carrier is smaller than or equal to 8 bits.

11. The method for configuring slot format indication according to claim 10, wherein the DCI comprises SFI information of a plurality of slots and/or a plurality of carriers.

12. The method for configuring slot format indication according to claim 10, further comprising:
configuring, for the terminal, SFI monitoring occasions and a payload size of SFI information in DCI corresponding to each of the SFI monitoring occasions, wherein each of the SFI monitoring occasions is used to detect at least one DCI, and payload sizes of SFI information in DCI corresponding to different monitoring occasions are the same or different.

13. The method for configuring slot format indication according to claim 12, wherein the configuring, for the terminal, the SFI monitoring occasions and the payload size of the SFI information in the DCI corresponding to each of the SFI monitoring occasions comprises:
configuring, for the terminal through a radio resource control (RRC) signaling, the SFI monitoring occasions and the payload size of the SFI information in the DCI corresponding to each of the SFI monitoring occasions.

14. The method for configuring slot format indication according to claim 9, wherein before configuring, for the terminal, the related information used to obtain the bit length of the SFI index information of the target cell or the target carrier, the method further comprises:
determining the related information used to obtain the bit length of the SFI index information of the target cell or the target carrier, wherein the related information used to obtain the bit length of the SFI index information of the target cell or the target carrier comprises the bit length of the SFI index information of the target cell or the target carrier, and/or a slot format configuration set corresponding to the bit length of the SFI index information of the target cell or the target carrier.

15. The method for configuring slot format indication according to claim 14, further comprising:
configuring, through a radio resource control (RRC) signaling, the related information used to obtain the bit length of the SFI index information of the target cell or the target carrier.

16. The method for configuring slot format indication according to claim 14, wherein the configuring, for the terminal, the related information used to obtain the bit length of the SFI index information of the target cell or the target carrier comprises:
configuring, per cell and for the terminal, the related information used to obtain the bit length of the SFI index information of the target cell; or
configuring, per carrier and for the terminal, the related information used to obtain the bit length of the SFI index information of the target cell or the target carrier.

17. A terminal, comprising a processor, a memory, and a program that is stored on the memory and executable on the processor, wherein when executing the program, the processor is configured to:
obtain a bit length of slot format indication (SFI) index information of a target cell or a target carrier and a slot format configuration set corresponding to the bit length;
detect the SFI index information of the target cell or the target carrier; and
determine a slot format configuration corresponding to the detected SFI index information based on the detected SFI index information and the slot format configuration set corresponding to the bit length of the detected SFI index information.

18. The terminal according to claim 17, wherein the processor is further configured to:
receive downlink control information (DCI) transmitted by a network-side device, wherein the DCI comprises SFI information of at least one slot, and SFI information of each of the at least one slot comprises SFI index information of at least one target cell or at least one target carrier; and
detect the SFI index information of the target cell or the target carrier in the received DCI.

19. The terminal according to claim 17, wherein the processor is further configured to:
receive the bit length of the SFI index information of the target cell or the target carrier and the corresponding slot format configuration set that are configured by the network-side device; or
receive the slot format configuration set corresponding to the SFI index information of the target cell or the target carrier configured by the network-side device, and determine the bit length of the SFI index information of the target cell or the target carrier according to the slot format configuration set corresponding to the SFI index information of the target cell or the target carrier configured by the network-side device; or
receive the bit length of the SFI index information of the target cell or the target carrier configured by the network-side device, and determine the slot format configuration set corresponding to the bit length of the SFI index information of the target cell or the target carrier configured by the network-side device, according to the bit length of the SFI index information of the target cell or the target carrier configured by the network-side device and a mapping relation between bit length of SFI index information and the slot format configuration set, wherein the mapping relation is predefined by a technical specification.

* * * * *